(No Model.)

3 Sheets—Sheet 2.

R. W. LYLE.
PULVERIZER OR MIXER.

No. 486,937.

Patented Nov. 29, 1892.

Fig. 2.

Witnesses
J. M. Fowler
Chas. E. Brock

Inventor
Robert W. Lyle
By Davis & Co.
Attorneys.

(No Model.) 3 Sheets—Sheet 3.
R. W. LYLE.
PULVERIZER OR MIXER.

No. 486,937. Patented Nov. 29, 1892.

Witnesses
Inventor
Robert W. Lyle
By Davis & Co
Attorneys.

UNITED STATES PATENT OFFICE.

ROBERT W. LYLE, OF NEW YORK, N. Y., ASSIGNOR OF ONE-HALF TO ANDERS M. STRUSHOLM, OF WOODBRIDGE, NEW JERSEY.

PULVERIZER OR MIXER.

SPECIFICATION forming part of Letters Patent No. 486,937, dated November 29, 1892.

Application filed June 2, 1892. Serial No. 435,297. (No model.)

*To all whom it may concern:*

Be it known that I, ROBERT W. LYLE, a citizen of the United States, residing at New York city, in the county of New York and State of New York, have invented a certain new, useful, and valuable Improvement in Pulverizers or Mixers, of which the following is a full, clear, and exact description.

This invention relates generally to pulverizers or mixers, and more particularly to an improved shoveling device for removing the crushed or mixed material from the revolving pan to the conveyer which leads to the machine.

The objects of my invention are to provide, first, a shoveling device which will be loaded by the revolution of the pan; secondly, one which will be automatically lifted out of the way when not in use, and, thirdly, one which shall consist of a few simply constructed and assembled parts.

With these various objects in view my invention consists, essentially, of a revolving pan and a vertically and laterally movable shovel arranged within the pan and adapted to lift the material from the pan and deposit it to one side of the same.

My invention consists, also, in certain details of construction and combination of parts, all of which will be fully described hereinafter, and pointed out in the claims.

Figure 1:
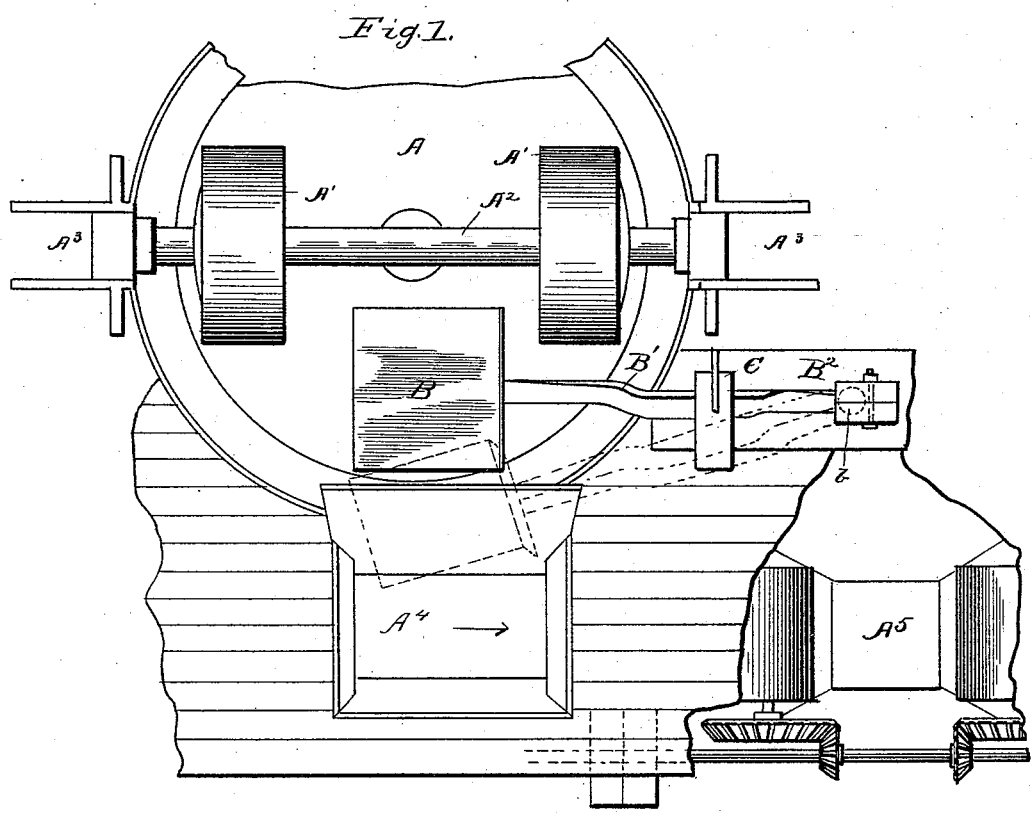
Figure 3:
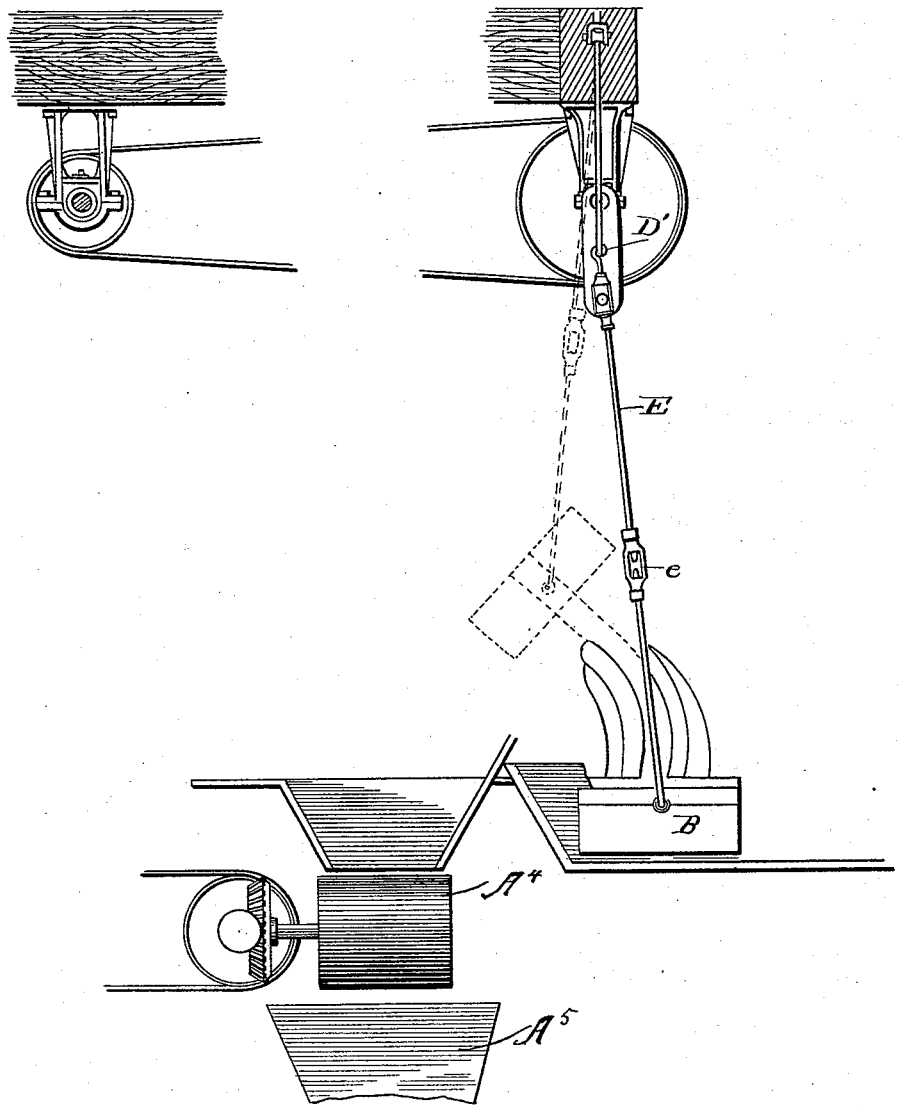

In the drawings forming a part of this specification, Figure 1 is a top plan view of my improved device. Fig. 2 is a front view, partly in section; and Fig. 3 is an end view, also partly in section.

In the practical embodiment of my invention I employ a revolving pan A, in which are arranged the revolving rollers A', mounted upon the shaft $A^2$, said shaft being stationary as regards horizontal movement, but is vertically adjustable within the bearings $A^3$. A conveyer $A^4$ is arranged to one side of the pan A, said conveyer discharging into a hopper $A^5$, as clearly shown, and, if desired, two pans and two conveyers may be employed, which discharge into a common hopper.

B indicates a flat metallic shovel having a handle B', which is secured in a standard $B^2$, secured to the floor adjacent to the conveyer by means of a ball-and-socket joint $b$.

The shovel B is adapted to rest in the pan adjacent to the conveyer, and the handle B' rests between the parallel curved guiding-standards C, arranged between the pan A and standard $B^2$. The guiding-standards C curve toward the conveyer, and as the shovel is elevated from the pan they carry said shovel toward the conveyer and at the same time incline the blade in that direction, so that any material carried by said blade will be deposited upon the conveyer. In order to operate the shovel, I employ a shaft D, carrying a crank-arm D' at one end and tight and loose pulleys $D^2$ and $D^3$, respectively, at its opposite end. A rod E is connected at one end to the crank-arm and at its lower end is swiveled to the shovel, as clearly shown in Fig. 2. The rod E is made in sections connected by a turnbuckle $e$, whereby the shovel can be adjusted at any desired height from the bottom of the pan.

F indicates a rope connected, also, to the crank-arm, said rope passing over pulleys $f$ and carrying a weight F' at its end, the purpose of said weight and cord being to hold the shovel elevated above the pan when not in use.

The operation of my improved device is as follows: The parts being arranged as shown in Fig. 2, the material to be crushed or mixed is thrown into the pan and the pan revolved. The driving-belt is now upon the loose pulley and the shovel held above the pan, as shown in dotted lines. When the material has been worked sufficiently, the belt is shifted to the tight pulley, which immediately operates the shovel, lowering the same, and as the pan revolves toward the shovel the material will be fed thereon. By this time the crank-arm is raising the rod, which elevates the shovel, and the guides carry it to one side and incline it toward the conveyer, depositing the material upon the conveyer. The shovel is then returned to the pan and the operations continued.

By having two pans and shovels one pan can be emptied while the other is being prepared, thus keeping the machine constantly supplied with material.

Having thus described my invention, what I claim is—

1. The combination, with the revolving pan, of a shovel swiveled at one end and adapted to be lowered into the pan, a rod connected to the shovel for elevating the same, and the guiding-standards adapted to move the shovel to one side of the pan as it is elevated, substantially as shown and described.

2. The combination, with the revolving pan, the shovel swiveled at one end, the elevating-rod, the guiding-standard, and the weighted cord for elevating the shovel when not in use, substantially as shown and described.

3. The combination, with a revolving pan, of a flat shovel swiveled to one side of the same and adapted to rest in said pan, the sectional elevating-rod, and the turnbuckle whereby the shovel may be adjusted, substantially as shown and described.

4. The combination, with a shovel having a handle swiveled at its outer end, the curved guide, and the operating-rod swiveled to the shovel for operating the same, substantially as shown and described.

5. The combination, with a shaft having tight and loose pulleys at one end and a crank-arm at the other, of the shovel swiveled at the end of its handle, the adjustable rod connecting the shovel and crank-arm, and the curved guide for swinging and turning the blade of the shovel, substantially as shown and described.

6. The combination, with the shaft-carrying pulley and crank-arm, of the weighted rope connected to said crank-arm, the adjustable rod also connected therewith, the shovel having a handle swiveled at its outer end, and the curved guiding-standards arranged between the end of the handle and shovel, substantially as and for the purpose described.

7. The combination, with a revolving pan, of a conveyer arranged at one side of the same and a shovel swiveled at one end adjacent to the conveyer and adapted to be intermittently lowered into and raised from said pan and swinging outward to discharge on the conveyer during its upward movement, substantially as shown and described.

In testimony whereof I affix my signature in presence of two witnesses.

ROBERT W. LYLE.

Witnesses:
ADRIAN LYON,
JAMES S. WIGHT.